United States Patent [19]

Kitamura et al.

[11] Patent Number: 4,652,715

[45] Date of Patent: Mar. 24, 1987

[54] METHOD OF MAKING A WELDED CAN BODY

[75] Inventors: Yoichi Kitamura; Yoshiro Togo, both of Yokohama; Yoshiteru Akae, Tokyo, all of Japan

[73] Assignee: Toyo Seikan Kaisha, Limited, Tokyo, Japan

[21] Appl. No.: 802,099

[22] Filed: Nov. 25, 1985

[30] Foreign Application Priority Data

Nov. 24, 1984 [JP] Japan .................................. 59-248480

[51] Int. Cl.[4] ............................................. B23K 11/06
[52] U.S. Cl. ......................................... 219/64; 219/83; 219/84
[58] Field of Search ....................... 219/64, 67, 83, 84, 219/59.1

[56] References Cited

U.S. PATENT DOCUMENTS 3,596,043  7/1971  Sporri ..................................... 219/83
4,160,892  7/1979  Opprecht et al. ...................... 219/64
4,409,456 10/1983  Kitamura et al. ..................... 219/64

Primary Examiner—E. A. Goldberg

Attorney, Agent, or Firm—Armstrong, Nikaido, Marmelstein & Kubovcik

[57] ABSTRACT

A method of making a welded can body wherein the opposite marginal edge portions of a metallic blank are overlapped to form a can body preform with an overlapped portion, and then the overlapped portion is electric-resistance mash-seam welded by using a pair of wire electrodes abutting on both the surfaces of the overlapped portion. At least one of the pair of the wire electrodes is formed with a flat main portion and a marginal projection including a slope contiguous to the flat main portion on the surface thereof, which surface is adapted to abut on the surface of the overlapped portion. The overlapped portion of the can body preform is fed in between the pair of wire electrodes such that the edge face of one of the marginal edge portions may be positioned on an area of the flat main surface portion in the vicinity of the slope or be positioned on the slope, allowing the marginal edge beside the edge face to flow outwardly in the circumferential direction of the can body preform along the slope during the welding.

10 Claims, 11 Drawing Figures

METHOD OF MAKING A WELDED CAN BODY

BACKGROUND OF THE INVENTION

The present invention relates to a method of making a welded can body formed by electric-resistance mash-seam welding and to be used for a food can, a carbonate drinks can or the like, particularly the can body having a weld of improved appearance which can be adequately covered or mended with a protecting material.

There is known a method of making a welded can body by using a so-called Soudronic welding machine of the type disclosed in the Japanese Examined Patent Publication No. 26213/1979 corresponding to U.S. Pat. No. 4160 892. In this method, the opposite marginal edge portions of a metallic blank, such as of tinplate are overlapped to form a can body preform with an overlapped portion, and then the overlapped portion is mash-seam welded to form a welded can body, by using a pair of wire electrodes, each having a flat surface abutting on the surface of the overlapped portion.

The mash seam weld thus formed is normally 1.3 to 1.7 times as thick as the blank sheet, and a step portion (refer to 22 in FIG. 2) with a relatively sharp slope is produced beside the weld. Further, when welding force or welding current is increased to raise weld strength, so-called "extruded iron" (refer to 23 in FIG. 2 and 33 in FIG. 8) with an irregular configuration and extending outwardly in the circumferential direction tends to be produced, or splashes (splashes of molten iron, refer to 34 in FIG. 8) tend to attach to the vicinity of the extruded iron.

Accordingly, there arises a problem that, when the areas having the extruded iron with an irregular configuration or the splashes are mended or coated by the application of lacquer or the like to prevent the interior surface of the weld and its vicinity from corroding by contents, non-coated portions or extremely thinly coated portion tend to be generated, thus making it difficult to attain satisfactory effect of the mending.

When a welded can body is used with its exterior surface being exposed to a bad corrosive environment, the same problem as above occurs on the exterior surface of the weld.

When contents are dry articles, oily liquid, oily aerosol or the like, the problem of interior surface corrosion hardly occurs. Even in this case, however, there arises another problem that extruded iron with an irregular configuration and splashes produced on the exterior surface beside the weld tend to injure the appearance, reducing the commercial value of the can body. Also, when a can is opened, the interior surface of the weld is readily visible, tending to cause the same problem as above.

Furthermore, a welded can body with satisfactory weld strength has been practically unable to be manufactured by the conventional welding method described above from a can body preform made of a surface treated steel sheet having a surface treatment layer with relatively high electric insulation, such as tinfree steel, without removing the surface treatment layer on the marginal edge portions to be welded of the blank.

SUMMARY OF THE INVENTION

It is an object of the present invention to provide a method of making a welded can body having a mash seam weld with improved mendability of at least one of the interior and exterior surfaces of the weld and its vicinity.

It is another object of the present invention to provide a method of making a welded can body having a mash seam weld with improved appearance of at least one of the interior and exterior surfaces of the weld and its vicinity.

It is a further object of the present invention to provide a method of making a welded can body having a mash seam weld, which, even when the can body preform is made of a surface treated steel sheet having a surface treatment layer with relatively high electric insulation, such as tinfree steel, can be formed with practically sufficient weld strength without removing the surface treatment layer on the marginal edge portions.

According to the present invention, there is provided a method of making a welded can body wherein the opposite marginal edge portions of a metallic blank are overlapped to form a can body preform with an overlapped portion, and then the overlapped portion is electric-resistance mash-seam welded by using a pair of wire electrodes abutting on both the surfaces of the overlapped portion, comprising: employing at least one wire electrode which is formed with a flat main portion and a marginal projection including a slope contiguous to the flat main portion on the surface thereof, which surface is adapted to abut on the surface of the overlapped portion; and feeding the overlapped portion of the can body preform in between the pair of wire electrodes such that the edge face of one of the marginal edge portions may be positioned on an area of the flat main surface portion in the vicinity of the slope or be positioned on the slope, allowing a blank material beside the edge face to flow outwardly in the circumferential direction of the can body preform along the slope during the welding.

Other objects and advantages of the invention will be apparent from the following description and the accompanying drawings.

DETAILED DESCRIPTION OF THE PREFERRED EMBODIMENTS

Figure 1:
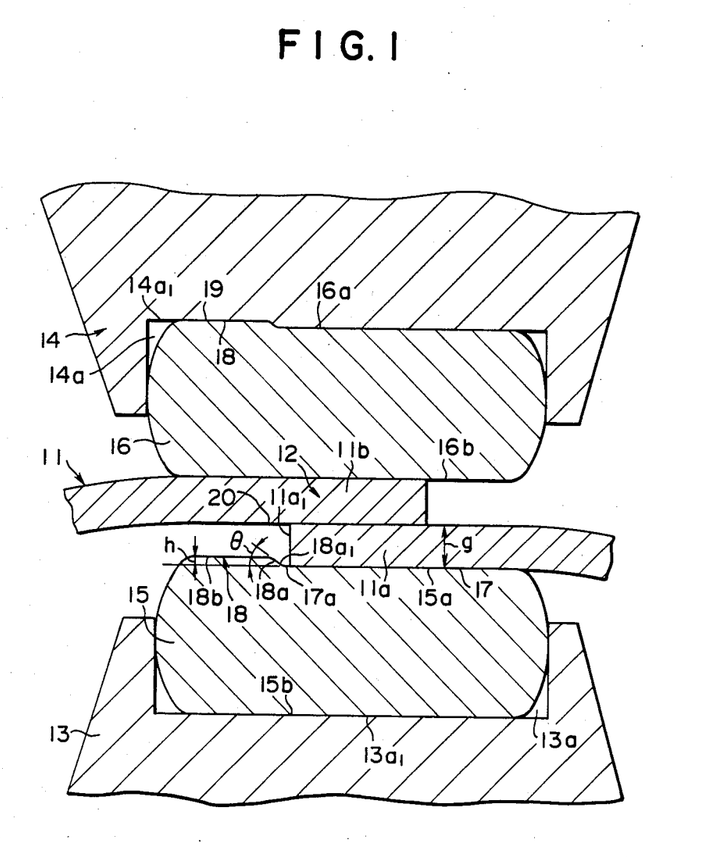
FIGS. 1 and 2 are vertical sections explanatorily showing a preferred embodiment of the method according to the present invention just before and just after welding, respectively.

In FIG. 1, reference numerals 11 and 12 indicate a can body preform and an overlapped portion, respectively. The can body preform 11 fragmentally shown is formed by overlapping the opposite marginal edge portions 11a and 11b of a metallic blank (not shown), of such as tinplate, tinfree steel, a very thinly nickel coated steel sheet, a very thinly nickel-and-tin coated steel sheet, a very thinly tin coated steel sheet, black plate or the like. Numerals 13 and 14 designate inside and outside electrode rollers, respectively.

An inside wire electrode 15 and an outside wire electrode 16, respectively, are backed up by the inside and outside electrode rollers 13 and 14. These electrodes normally consist of a single continuous copper wire that is adapted to weld the overlapped portion of a can body preform as the inside (or outside) wire electrode and then weld the overlapped portion of a subsequent can body preform as the outside (or inside) wire electrode. The upper surface 15a of the inside wire electrode 15 normally runs as the upper surface 16a of the outside wire electrode 16, as shown in FIG. 1.

In FIG. 1, the upper surface 15a of the inside wire electrode 15, that, is the surface abutting on the overlapped portion 12 comprises a flat main portion 17 and a marginal projection 18 both extending longitudinally. The latter consists of a preferably gentle slope 18a contiguous to the flat main portion 17 and a marginal flat portion 18b. The lower surface 15b of the inside wire electrode 15 is as wholly flat as that of a conventional wire electrode. Accordingly, the lower surface 16b of the outside wire electrode 16 that abuts on the overlapped portion 12 is also wholly flat, and further the upper surface 16a of the outside wire electrode 16 is formed with the marginal projection 18.

The groove 14a of the outside electrode roller 14 through which the outside wire electrode 16 passes has a shallow groove 19 formed in the bottom surface 14a₁ thereof and of the configuration corresponding to the marginal projection 18, and thus the lower surface 16b of the outside wire electrode 16 and the main flat portion 17 of the upper surface 15a of the inside wire electrode 15 are parallel to each other.

Each width of the upper and lower surfaces 15a and 16b is dimensioned larger than that of the overlapped portion 12 to enable mash seam welding. The wire electrode with the sectional profile described above can be formed by rolling a round copper wire by means of a flattening roll mill having a groove with a sectional profile corresponding to that of the marginal projection 18, which mill is provided on the upstream side of the inside electrode roller 13 (or the outside electrode roller 14) of a welding machine employed. The wire electrode may be also formed by drawing a round copper wire through a die aperture having the last-mentioned sectional profile.

Figure 3:
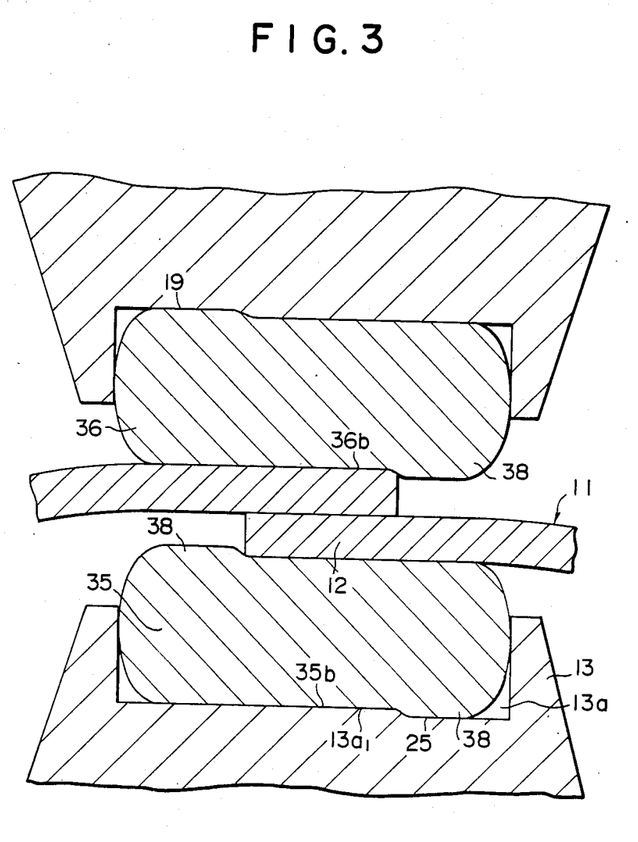
FIGS. 3 and 4 are vertical sections explanatorily showing another preferred embodiment of the method according to the present invention just before and just after welding, respectively.

In a welding operation, the can body preform 11 is fed in between both the wire electrodes so that the edge face 11a₁ of the lower marginal edge portion 11a of the overlapped portion 12 may be positioned on an area 17a of the main flat portion 17 near the slope 18a (refer to FIG. 1) or be positioned on the slope 18a (refer to FIG. 3).

Figure 2:
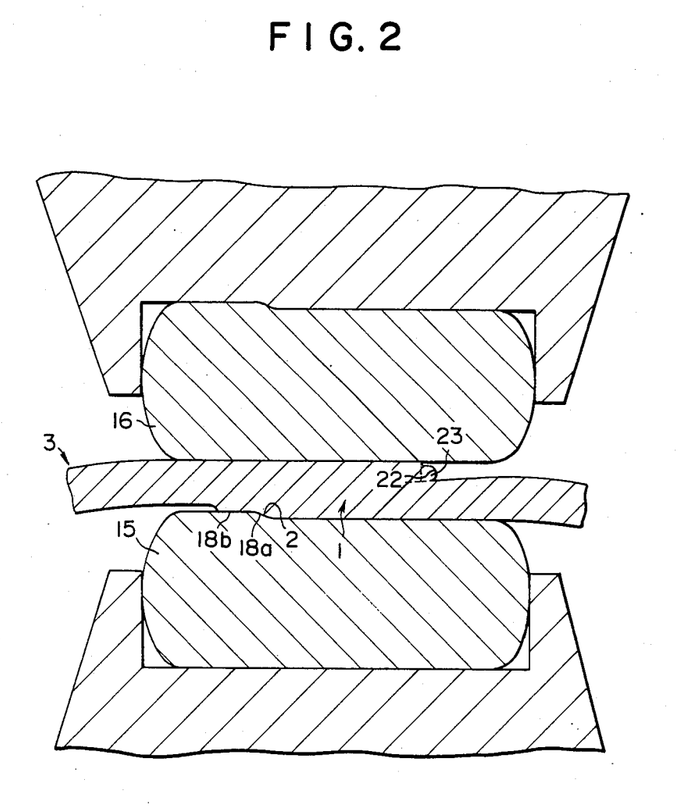

As the mash seam welding progresses, the thickness of the overlapped portion 12 is reduced and the material of this portion flows or is extruded outwardly in the circumferential direction of the can body preform. Accordingly, the material near the edge face 11a₁ flows outwardly in the circumferential direction along the slope 18a or further along the marginal flat portion 18b. When the material flows, even if the extruded iron and splashes are produced on the lower surface area 20 near the edge face 11a₁ of the lower marginal edge portion 11a, they are mashed to a sectional configuration corresponding to the marginal projection 18, and are substantially extinguished. As a result, is formed an interior step portion 2 which has a relatively gentle slope and is easy to mend of protect with lacquer or the like, as shown in FIG. 2.

On the other hand, since the lower surface 16b of the outside wire electrode 16 is wholly flat, an exterior step portion 22 with a sharp, substantially vertical slope which is formed by the extruded iron 23 with an irregular, rugged configuration, and, depending on the welding condition, splashes not shown (refer to 34 in FIGS. 8 and 9) are produced on the exterior surface of the weld 1 of the welded can body 3 formed.

Figure 4:
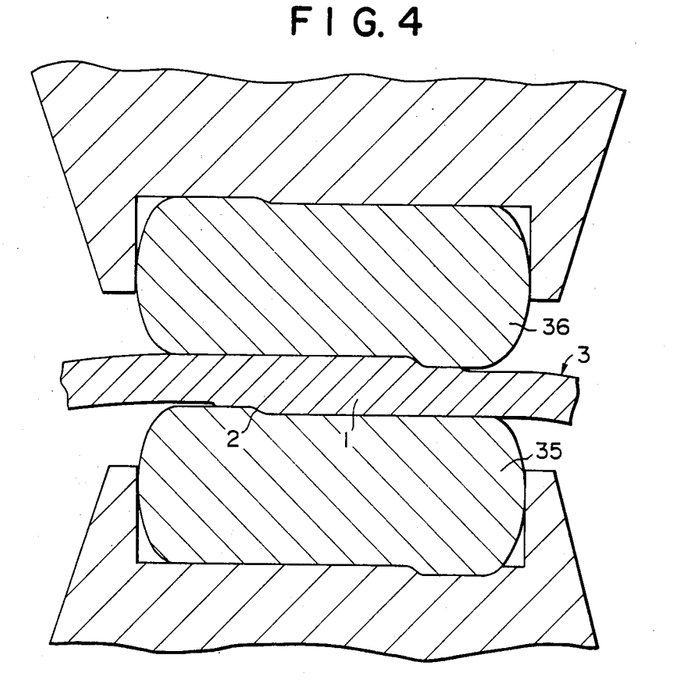

When a step portion with as relatively gentle slope as that of the interior step portion 2 is desired to be obtained also on the exterior surface of the weld 1, a single wire electrode formed with a marginal projection 38 on the rightside (as viewed in FIGS. 3 and 4) of the lower surface 36b of an outside wire electrode 36, accordingly, also on the rightside of the lower surface 35b of an inside wire electrode 35, may be used as shown in FIGS. 3 and 4, said marginal projection 38 corresponding to that (18) shown in FIG. 1.

In this case, it is preferable to provide a shallow groove 25, corresponding to the shallow groove 19 shown in FIG. 1, on the rightside of the bottom surface 13a₁ of a groove 13a formed in the inside electrode roller 13. Further, when a step portion with a relatively gentle slope is desired to be obtained only on the outside of the weld depending on the use of the welded can body, a marginal projection may be provided only on the lower surface 16b of the outside wire electrode 16.

It is desirable to determine the height (h), width and the like of the marginal projection 18 so that the projection 18 may not be in contact with the lower surface of the upper marginal edge portion 11b. This is because otherwise spark marks will be produced on the lower surface area in contact with the marginal projection 18, injuring the corrosion resistance of the area. To that end, the height (h) of the marginal projection 18 is preferably equal to 0.5×g or below (g denotes a blank thickness), more preferably to 0.35×g or below. Further, to obtain the step portion 2 with relatively gentle slope described above by mashing the extruded iron, the height (h) is preferably equal to 0.1×g or above, more preferably to 0.2×g or above.

The configuration of the step portion 2 formed on the weld is defined by the slope 18a to be same as that of the slope 18a. The gradient $\theta$ (see FIG. 1) of the slope 18a preferably ranges from about 5 to about 70 degrees, more preferably from about 10 to about 40 degrees. With the gradient $\theta$ of the slope 18a smaller than about 40 degrees, it will be possible to prevent an extremely thin coating from being formed for mending.

Additionally, it is preferable that the slope 18a and the upper surface 15a are contiguous with each other through a curved surface 18$a_1$ with a radius of curvature of 0.1 mm or above. This is also to prevent an extremely thin coating from being formed for mending.

Figure 5:
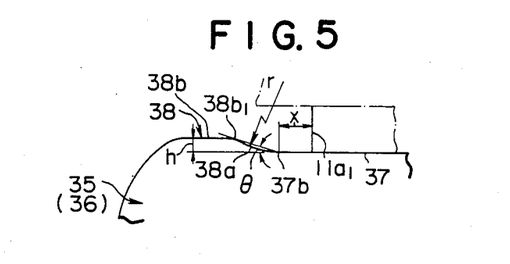
FIG. 5 is an explanatory fragmentary enlarged section of an example of a wire electrode employed in the present invention.

Further, the slope may be an inwardly curved surface as denoted by 38a in FIG. 5. For the slope 38a, the gradient θ is defined as an angle between a straight line connecting the edge 37b of the flat main portion 37 with the edge 38$b_1$ of the marginal flat portion 38b of the marginal projection 38, both the edges being on the side of the slope 38a, and the extension of the flat main portion 37, as viewed in FIG. 5.

In addition, the slope 18a only may be formed without the marginal flat portion 18b. In this case, however, to prevent the extruded iron with an irregular configuration from being produced, welding may be preferably performed under the condition that the material will not flow outwardly beyond the slope 18a.

Even when a metallic blank for forming a can body preform is formed from a surface treated steel sheet with a relatively thick (usually 10 mg/m² or above in terms of chromium metal), electrically insulating chromate layer (hydrated chromium oxide layer) as the uppermost surface layer on both the sides thereof, such as tinfree steel or a very thinly nickel coated steel sheet or the like, a welded can body with a weld having practically satisfactory weld strength can be manufactured by employing inside and outside wire electrodes both having the marginal projections on the respective surfaces which abut on the overlapped portion as shown in FIG. 3, without removing a surface treatment layer including the chromate layer, on the marginal edge portions to be welded.

In this case, however, it is desirable to employ a tin or tin alloy (having a relatively low melting point, such as a tin-zinc alloy or a tin-lead alloy) coated copper wire (normally with 0.5–5 g/m² thick coating) as the wire electrode. This is because pitting-like, locally fused defects tend to occur on the surface of the weld, when bare copper wire electrodes are employed for welding a can body preform made from the metallic blank of the type mentioned above without removing the surface treatment layer.

Though welding may be performed in the air, it is desirable to perform welding in an inert gas atmosphere (such as nitrogen, argon, helium or carbon dioxide gas).

The inventors of the present invention have acquired the findings that, when the can body preform of the type described above which has the electrically insulating surface treatment layer on the overlapped portion is mash-seam welded by the so-called "Soudronic welding machine" by using a conventional wire electrode having flat surfaces on both the sides, the application of a far larger welding force (per the same width of the overlapped portion) than that required for a can body preform formed from tinplate breaks the surface treatment layer (including the chromate layer) and reduce the electric resistance of the overlapped portion, thus enabling the mash seam welding.

In this case, however, during the welding the marginal edge portions of the longitudinal end portions of the overlapped portion, particularly of the tail end thereof, tends to deviate outwardly in the circumferential direction due to the large welding force, thus to reduce the width of the portion of the weld where the deviation has occurred, or to form a butt-weld-like weld portion thereon in the extreme case. As a result, the weld strength of these portions is reduced, and thus a satisfactory weld which can withstand flanging, necking-in and the like will not be obtained.

According to the present invention, the satisfactory weld can be obtained even by applying a welding force which is small to the extent that the above-mentioned deviation will not be caused, for a can body preform of the type described above. The reason therefor is assumed as follows.

A certain portion in the longitudinal direction of the overlapped portion is electric-resistance-heated, softened (a low carbon steel sheet beings to be softened at about 500°–600° C.) and begins to be mashed, soon after the portion comes into contact with the wire electrodes. Then, the bare edge faces of both the marginal edge portions free from the electrically insulating surface treatment layer is extruded to be in contact with the slope of the marginal projection of the corresponding wire electrode. Further, when the overlapped portion is mashed, some cracks are produced in the surface treatment layer on the area of the marginal edge portion which area has come in contact with the marginal projection.

Accordingly, welding current may become easy to flow between the opposite slopes of the inside and outside wire electrodes through the extruded edge faces and the above-mentioned cracks, resulting in relatively smooth performance of welding. The above assumption may be supported by FIG. 10, wherein a heat affected zone is formed as transversely extending through the weld across both the step portions.

Practical examples will be described below.

PRACTICAL EXAMPLE 1

A blank of a tinplate of 0.2 mm thick and tin coating weight 2.8 g/m² on each surfaces was formed into a can body preform with 70 mm inside diameter having the overlapped portion of 0.4 mm wide. The overlapped portion was mash-seam welded by using a Soudronic welding machine in an atmosphere of nitrogen gas under the condition described below, to form a welded can body.

Wire electrodes of the type shown in FIG. 3 as the outside and inside wire electrodes 35 and 36 having the marginal projection 38 on the upper and lower surfaces thereof, respectively, were used for the welding. The wire electrodes 35 and 36 were made from a bare copper wire. Referring to FIG. 5, the marginal flat portion 38b was 0.06 mm high, the slope 38a was an inwardly curved surface with a 0.2 mm radius (r) of curvature, and the gradient (θ) of the slope 38a was 17 degrees. The overlapped portion was fed in between both the wire electrodes 35 and 36 such that the distance (x) between the edge face 11$a_1$ and the edge 37b of the flat main portion 37 on the side of the slope 38a may be 0.05 mm.

The welding force, welding current, frequency thereof and welding speed were 50 kg, about 3400 A, 250 Hz and 30 m/min, respectively. The weld 1 obtained was 0.3 mm thick.

Figure 6:
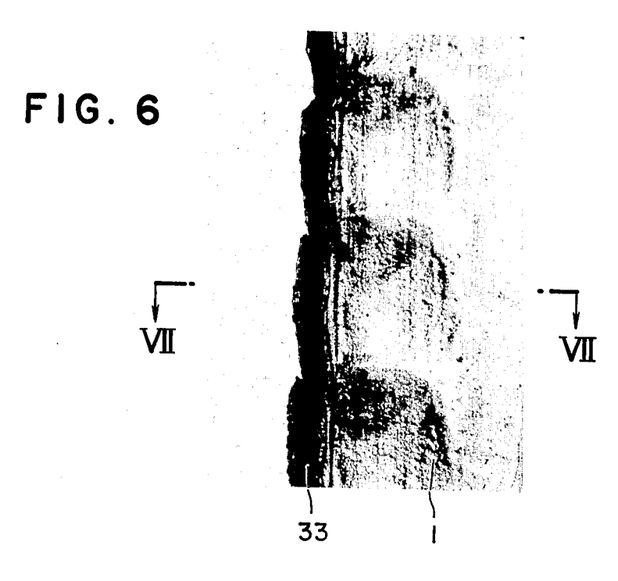
FIG. 6 is a micrograph showing the top view of an example of the weld of a welded can body manufactured according to the present invention.
Figure 7:
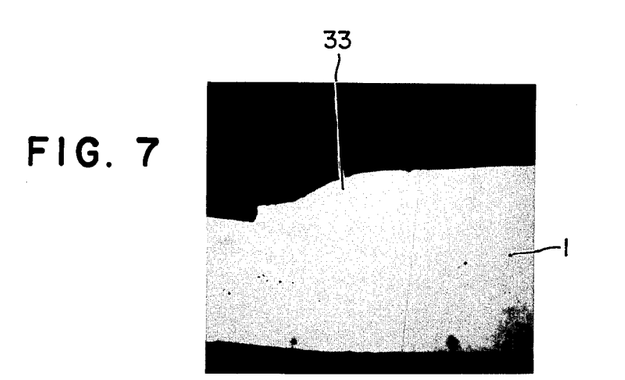
FIG. 7 is a vertical, sectional metallurgical micrograph of the weld shown in FIG. 6 taken along line XII–VII of FIG. 6.

As shown in FIG. 6 (magnification×30) and FIG. 7 (magnification ×125; etched with 5% alcoholic solution of picric acid) and shape of the extruded iron 33 in the weld 1 was regular with conformity to the waveform of the alternating current used, and none of the extruded iron with an irregular configuration nor the splash were found thereon.

An enamel rater value which is an index indicative of an exposed area of iron, and is smaller as the area is smaller, was determined by the method described below, after expoxy phenolic lacquer had been applied to the interior surface of the weld and then dried to form a coating film of average thickness of 13 to 16 μm. The enamel rater value of the weld was 0 to 2 mA. For reference, the enamel rater value of the bare blank employed was several hundreds mA.

The method of determining the enamel rater value:

An about 20 mm wide test piece carrying the weld extending along the center of the piece width is cut out of the welded can body in the direction of the height of the can body. The test piece is completely sealed with wax or the like, except an area of 100 mm longitudinal length of the weld including the step portion 2 and its vicinity in the central portion thereof.

The test piece is electrolyzed in an aqueous solution, i.e. electrolyte including 1 wt. % sodium chloride and 0.02 wt. % surface active agent in a breaker with a counter electrode of a stainless steel rod at a constant voltage of +6.3 V (DC) during a given time of 4 seconds, and the electrolytic current is determined. The current is directly proportional to the exposed metal area.

Figure 8:
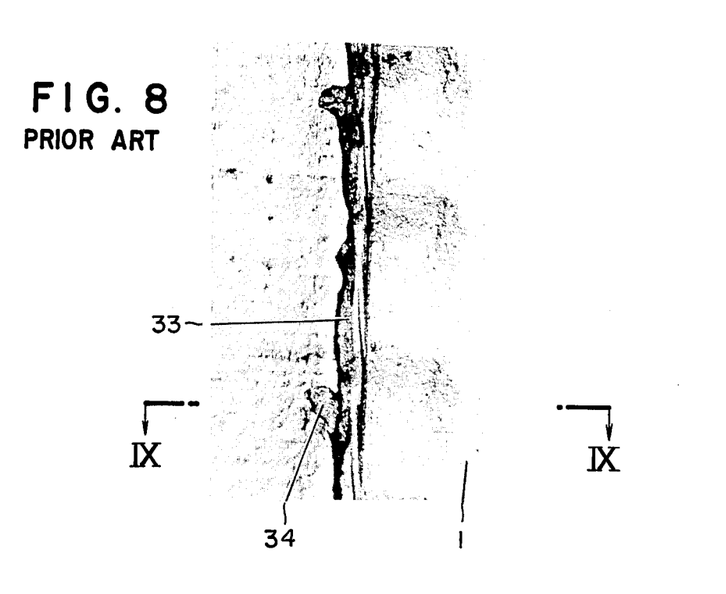
FIG. 8 is a micrograph showing the top view of an example of the weld of a welded can body manufactured according to the conventional method.
Figure 9:
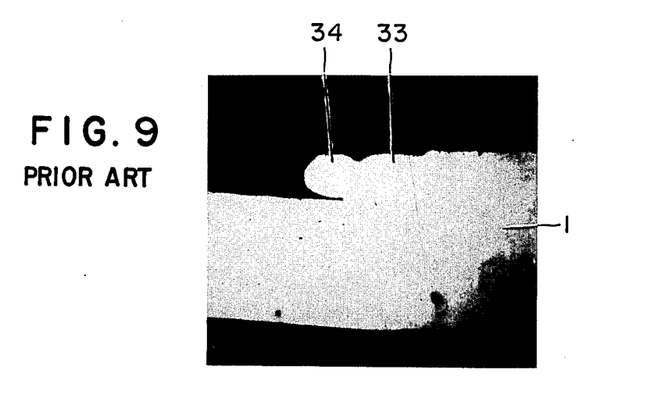
FIG. 9 is a vertical, sectional metallurgical micrograph of the weld shown in FIG. 8 taken along line IX—IX of FIG. 8.

For sake of comparison, a weld was formed in the same manner as the above except that the conventional wire electrodes having flat upper and lower surfaces were used. As shown in FIG. 8 (magnification ×30) and FIG. 9 (magnification ×125; etched with 5% alcoholic solution of picric acid), the extruded iron 33 of an irregular, rugged configuration and splashes 34 were found near the weld.

PRACTICAL EXAMPLE 2

A blank of a tinfree steel of 0.21 mm thick and having a chromium surface layer comprising a chromium metal layer of 100 mg/m² and a hydrated chromium oxide layer, i.e. chromate layer of 16 mg/m² in terms of metal chromium was formed into a can body preform of 70 mm inside diameter with an overlapped portion of 0.4 mm wide. The chromium surface layer near the overlapped portion was left unremoved.

The same wire electrodes 35 and 36 were employed as those employed in the practical example 1, except that the electrodes were coated with tin of 5 g/m².

The welding conditions were also same as those in the practical example 1 except that welding current and the distance x were about 2500 A and 0 mm, respectively.

Figure 10:
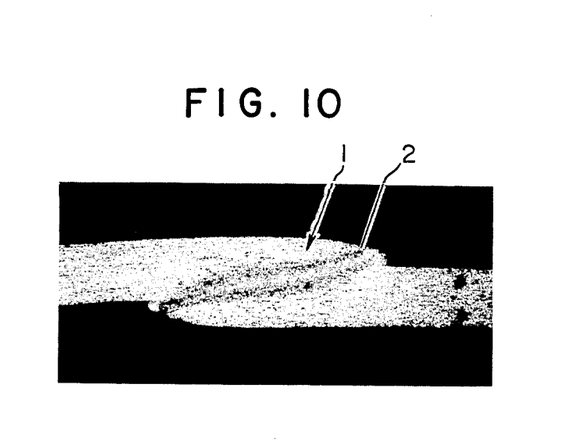
FIG. 10 is a vertical, sectional metallurgical micrograph of another example of the weld of a welded can body manufactured according to the present invention.
Figure 11:
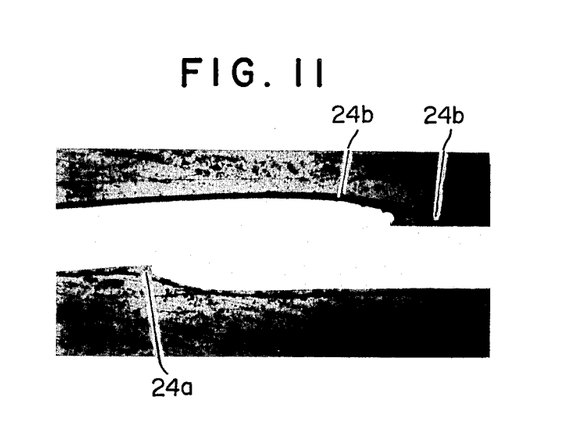
FIG. 11 is a vertical, sectional metallurgical micrograph of the weld shown in FIG. 10 after lacquer film has been coated on the weld.

The weld 1 obtained was 0.3 mm thick and none of the extruded iron of an irregular configuration, splashes nor pittings were found thereon. Epoxy-phenolic lacquer and epoxy-esters lacquer were applied to the interior and exterior surfaces, respectively, of the weld and then dried. FIGS. 10 and 11 are sectional metallurgical micrographs (magnification ×62.5; etched with 5% alcoholic solution of picric acid) of the neighborhood of the weld before and after the application of the lacquers, respectively. In FIG. 11, 24a and 24b indicate interior and exterior coating layers, respectively.

The enamel rater value of the interior surface of the weld was 0 to 2 mA.

For sake of comparison, the overlapped portion of a tinfree steel can body preform was mash-seam welded with conventional wire electrodes having flat surfaces which were coated with tin of 5 g/m² under the same condition as described above, except that welding current and welding force were changed.

In the case of the welding force of 50 kg and the welding current below about 2300 A only slight splashes were produced. In a tearing test described below, however, there arose flaking in the weld failing to obtain a welding strength sufficient for practical use. On the other hand, when the welding current was about 2600 A or above, plenty of splashes were produced and the enamel rater value of the interior surface was 20 to 100 mA, although the tearing test was passed.

When welding force and welding current were 65 kg and about 2800 A, respectively, the longitudinally central portion of the weld passed the tearing test, but plenty of splashes were produced thereon. Furthermore, during the welding an outward slippage in the circumferential direction occurred in the tail end of the overlapped portion. The tail end was formed into a butt-weld-like weld, and a weld satisfactory for practical use was not obtained.

Method of tearing test:

Notches are formed in the areas of the original marginal edge portions adjacent to both sides of one of the end portions of the weld. The end portion is gripped with a pair of pincers and pulled until the weld is teared off the welded can body starting from the notches. When none of flaking occurs anywhere in the weld zone, the test shall be passed.

What is claimed is:

1. Method of making a welded can body comprising the steps of:
   overlapping opposite marginal edge portions of a metallic blank to form a can body preform having an overlapped portion defined by said marginal edge portions, said overlapped portion having an outside surface and an inside surface, each marginal edge portion having an edge face,
   feeding said overlapped portion in between a pair of wire electrodes abutting both said outside and said inside surfaces, at least one of said wire electrodes having a longitudinally extending surface abutting one of said outside and inside surfaces which comprises a flat main portion and a marginal projection laterally adjacent said flat main portion, said marginal projection including a slope contiguous to said flat main portion sloping toward the other of said pair of wire electrodes, said overlapped portion being fed between said wire electrodes so that the edge face of one of said marginal edge portions is positioned on an area of said flat main portion of said at least one of said wire electrodes in the vicinity of said slope, and
   electric resistance mash-seam welding said overlapped portion between said pair of electrodes while allowing a portion of said metallic blank beside said edge face of said one of said marginal edge portions adjacent said slope to flow outwardly in a circumferential direction of said can body preform along said slope.

2. A method of making a welded can body as claimed in claim 1, wherein said pair of wire electrodes consists of a single continuous copper wire.

3. A method of making a welded can body as claimed in claim 1, wherein each of said wire electrodes is backed up by an electrode roller.

4. A method of making a welded can body as claimed in claim 1, wherein said overlapped portion is welded in an atmosphere of an inert gas.

5. A method of making a welded can body as claimed in claim 3, wherein said metallic blank is formed from a surface treated steel sheet having a relatively thick, electrically insulating chromate layer on both the surfaces, each of said wire electrodes is formed with said flat main portion and said marginal projection, and the surface of said wire electrode is coated with tin or a tin alloy.

6. Method of making a welded can body comprising the steps of:

overlapping opposite marginal edge portions of a metallic blank to form a can body preform having an overlapped portion defined by said marginal edge portions, said overlapped portion having an outside surface and an inside surface, each marginal edge portion having an edge face, feeding said overlapped portion in between a pair of wire electrodes abutting both said outside and said inside surfaces, at least one of said wire electrodes having a longitudinally extending surface abutting one of said outside and inside surfaces which comprises a flat main portion and a marginal projection laterally adjacent said flat main portion, said marginal projection including a slope contiguous to said flat main portion sloping toward the other of said pair of wire electrodes, said overlapped portion being fed between said wire electrodes so that the edge face of one of said marginal edge portions is positioned on said slope of said at least one of said wire electrodes, and electric resistance mash-seam welding said overlapped portion between said pair of electrodes while allowing a portion of said metallic blank beside said edge face of said one of said marginal edge portions adjacent said slope to flow outwardly in a circumferential direction of said can body preform along said slope.

7. A method of making a welded can body as claimed in claim 6, wherein said pair of wire electrodes consists of a single continuous copper wire.

8. A method of making a welded can body as claimed in claim 6, wherein each of said wire electrodes is backed up by an electrode roller.

9. A method of making a welded can body as claimed in claim 6, wherein said overlapped portion is welded in an atmosphere of an inert gas.

10. A method of making a welded can body as claimed in claim 8, wherein said metallic blank is formed from a surface treated steel sheet having a relatively thick electrically insulating chromate layer on both the surfaces, each of said wire electrodes is formed with said flat main portion and said marginal projection, and the surface of said wire electrode is coated with tin or a tin alloy.

* * * * *